United States Patent [19]

Hemmeke et al.

[11] Patent Number: 4,681,363
[45] Date of Patent: Jul. 21, 1987

[54] VISOR SYSTEM

[75] Inventors: Ronald L. Hemmeke; Scott A. Spykerman, both of Holland, Mich.

[73] Assignee: Prince Corporation, Holland, Mich.

[21] Appl. No.: 796,090

[22] Filed: Nov. 7, 1985

[51] Int. Cl.[4] ............................................. B60J 3/02
[52] U.S. Cl. .............................. 296/97 G; 296/97 K
[58] Field of Search ................ 296/97 R, 97 B, 97 G, 296/97 H; 160/97 K, DIG. 3

[56] References Cited

U.S. PATENT DOCUMENTS

| | | | |
|---|---|---|---|
| 1,898,276 | 2/1933 | Van Dresser | 296/97 G |
| 1,932,475 | 10/1933 | Peteler | 296/97 G |
| 1,941,032 | 12/1933 | Knowles | 296/97 G |
| 2,107,247 | 2/1938 | Johnson | 296/97 G |
| 2,120,892 | 6/1938 | Francis | 296/97 G |
| 2,201,197 | 5/1940 | Minor, Jr. | 296/97 G |
| 2,261,881 | 11/1941 | Horstmann | 296/97 G |
| 2,414,340 | 1/1947 | Spraragen | 296/97 R |
| 2,492,074 | 12/1949 | Thompson | 160/DIG. 3 |
| 2,517,872 | 8/1950 | Hamel | 296/97 G |
| 2,596,873 | 5/1952 | Solmes | 296/97 G |
| 2,628,008 | 2/1953 | Innis | 296/97 R |
| 2,634,161 | 4/1953 | Beets | 296/97 R |
| 2,667,222 | 1/1954 | McCarthy et al. | 296/97 R |
| 2,695,193 | 11/1954 | Hamel | 296/97 R |
| 2,823,950 | 2/1958 | Harris | 296/97 R |
| 2,829,920 | 4/1958 | Cohen | 296/97 G |
| 2,831,725 | 4/1958 | Chester | 296/97 G |
| 2,869,922 | 1/1959 | Chester | 296/97 G |
| 2,921,813 | 1/1960 | Lowry | 296/97 G |
| 2,932,539 | 4/1960 | Galbraith | 296/97 G |
| 2,948,566 | 8/1960 | Massey | 296/97 G |
| 2,965,415 | 12/1960 | Dryden | 296/97 R |
| 2,978,274 | 4/1961 | Ordman | 296/97 R |
| 2,999,718 | 9/1961 | Handler | 296/97 R |
| 3,016,262 | 1/1962 | Hunt | 296/97 G |
| 3,032,371 | 5/1962 | Berridge et al. | 296/97 R |
| 3,191,986 | 6/1965 | Simon | 296/97 G |
| 3,328,071 | 6/1967 | Johnson | 296/97 G |
| 3,369,837 | 2/1968 | Metier | 296/97 G |
| 3,403,937 | 10/1968 | Quaine | 296/97 G |
| 3,499,679 | 3/1970 | Olander | 296/97 G |
| 3,556,585 | 1/1971 | Binder | 296/97 R |
| 3,617,088 | 11/1971 | Graham | 296/97 G |
| 3,649,068 | 3/1972 | Moynihan | 296/97 G |
| 3,865,428 | 2/1975 | Chester | 296/97 R |
| 4,169,552 | 10/1979 | Lichtenstein et al. | 296/97 G |
| 4,272,118 | 6/1981 | Viertel et al. | 296/97 R |
| 4,323,275 | 4/1982 | Lutz | 296/97 G |
| 4,521,047 | 6/1985 | Saxman | 296/97 R |

FOREIGN PATENT DOCUMENTS

| | | | |
|---|---|---|---|
| 36659 | 10/1926 | Denmark. | |
| 1340981 | 9/1963 | France | 296/97 G |
| 1396360 | 3/1965 | France. | |
| 2497157 | 2/1982 | France. | |
| 639882 | 3/1962 | Italy. | |
| 58-63517 | 4/1983 | Japan. | |

Primary Examiner—Robert R. Song
Attorney, Agent, or Firm—Price, Heneveld, Cooper, DeWitt & Litton

[57] ABSTRACT

A visor system includes a pair of spaced mounting brackets to support a first visor movable between a raised, stored position and a lowered, use position and one which can be moved to a side window for providing protection against incident light from the side. The brackets also support an auxiliary visor which is pivoted on an axis located above the vehicle windshield between a raised, stored position and a lowered, use position and which includes an auxiliary panel that is movable laterally along the axis.

13 Claims, 10 Drawing Figures

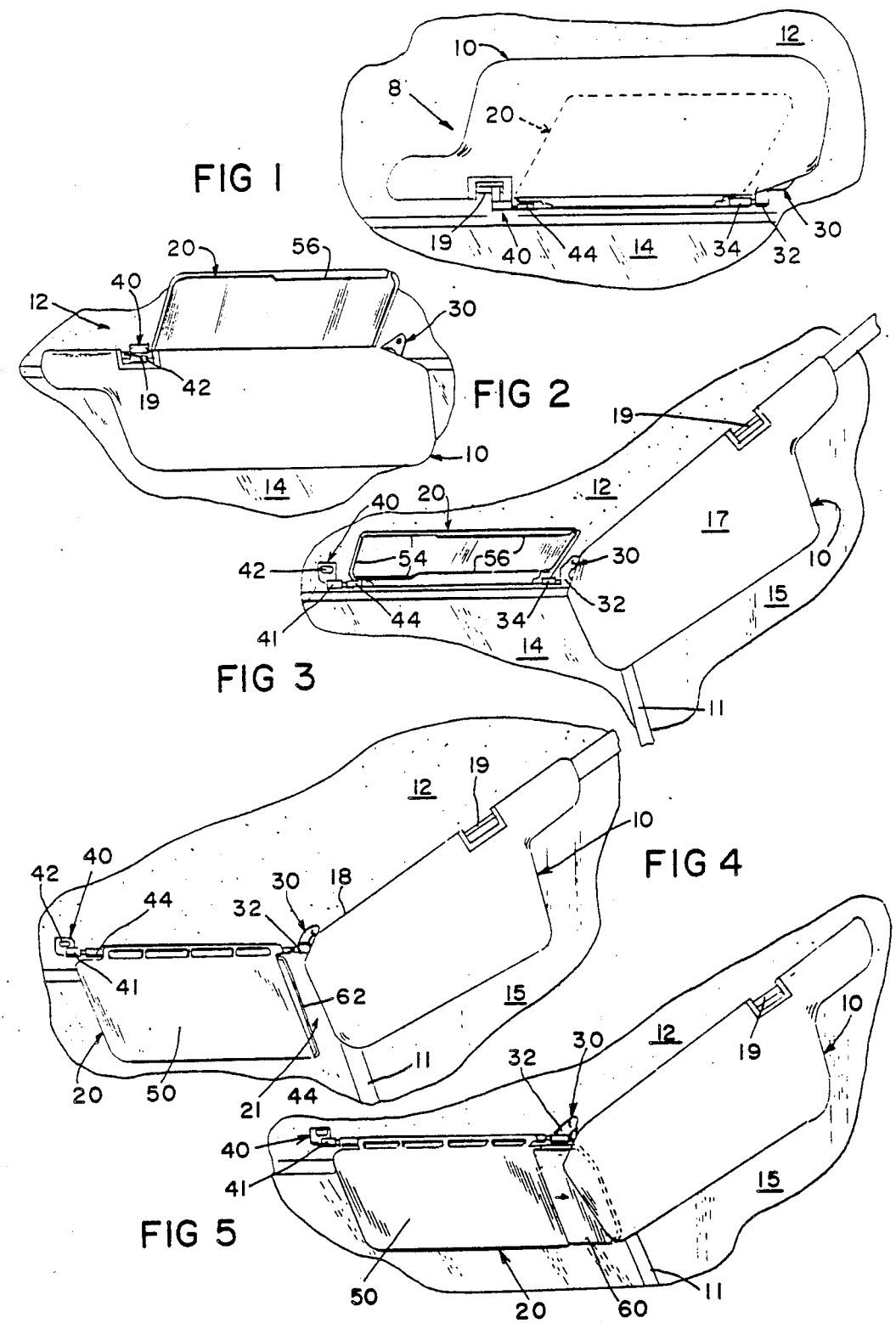

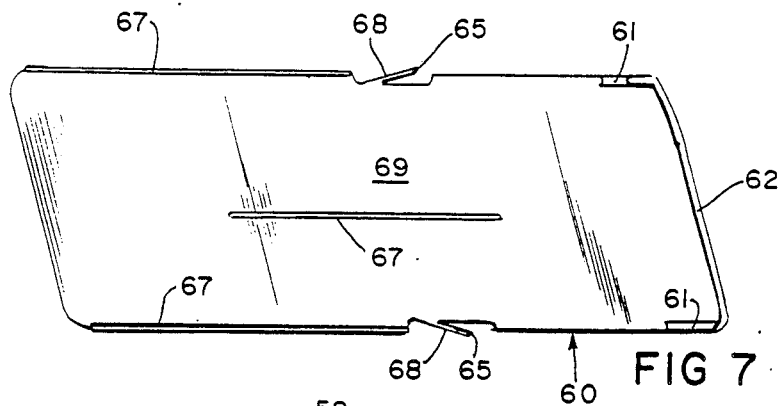
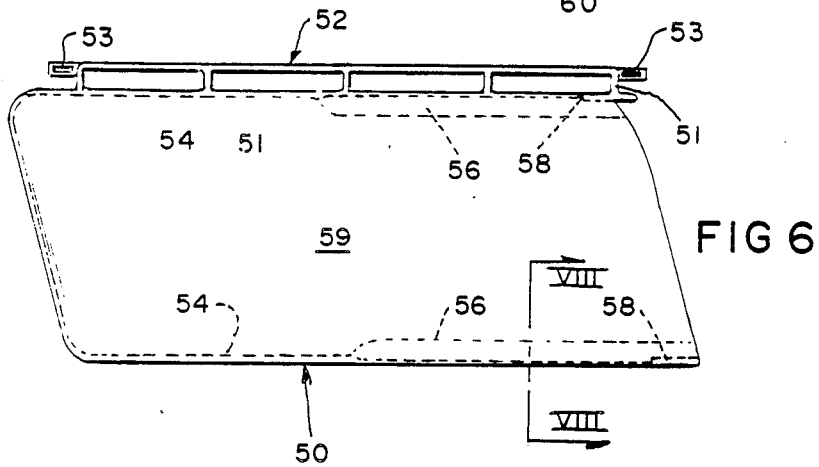
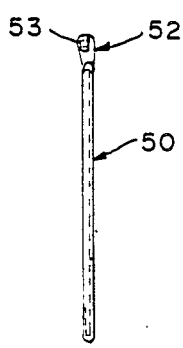
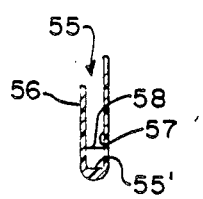
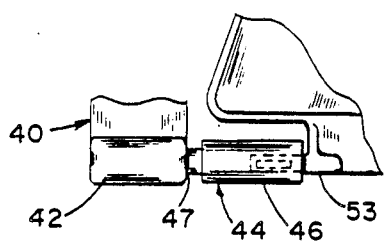
FIG 7
FIG 6
FIG 9    FIG 8    FIG 10

VISOR SYSTEM

BACKGROUND OF THE INVENTION

The present invention pertains to vehicle visors and particularly to a system with multiple visors.

Typically, automotive visors are installed such that they can pivot from a lowered use position against the windshield or over a side window if the sun is entering the vehicle from the side. When driving along a curved highway, it can be necessary to frequently move the visor from the front to the side while driving. This can not only be burdensome, but when ducking under the visor as it is moved, the driver's attention is distracted, creating a potentially hazardous driving situation.

In order to provide both side and front window shade, visor systems have been proposed which employ a primary conventional visor and a secondary or auxiliary visor. U.S. Pat. Nos. 2,261,881; 2,492,074; 2,517,872; 2,823,950; and 3,499,679 are representative of such structure. In these structures, an auxiliary visor is provided and is coupled directly to the primary visor through a pivot connection such that it can be moved to a variety of locations providing sun blocking along more than one axis of incident sunlight. Other prior art visor systems provide separate side window visors which are permanently mounted above the side windows. U.S. Pat. No. 4,468,062, assigned to the present assignee, is representative of a side window visor installation.

SUMMARY OF THE PRESENT INVENTION

The system of the present invention provides an improved auxiliary visor system in which a pair of spaced mounting brackets support a first visor movable between a raised, stored position and a lowered, use position and one which can be moved to a side window for providing protection against incident light from the side. The brackets also support an adjustable width auxiliary visor which is pivoted on an axis located above the vehicle's windshield between a raised, stored position and a lowered, use position and include a sliding panel movable laterally along the axis. With such a system, the auxiliary visor can become the primary windshield visor with the sliding panel selectively movable to block light, while the primary visor is moved to the side window position. Alternatively, when only a front visor is necessary, the primary visor can be used independently of the auxiliary visor panel. The system is relatively compact and employs a pair of parallel pivot axles which allow storage of the visor system against the vehicle headliner when not in use in a compact and attractive visor installation which has the clean, trim appearance of a single visor installation. These and other features, objects and advantages of the present invention will become apparent upon reading the following description thereof together with reference to the accompanying drawings in which:

BRIEF DESCRIPTION OF THE DRAWINGS

FIG. 1 is a front elevational view of a passenger side visor installation embodying the present invention shown with both visor panels in a raised, stored position;

FIG. 2 is a front elevational view of the structure shown in FIG. 1 with the primary visor shown in a lowered, forward windshield use position;

FIG. 3 is a front elevational view of the structure shown in FIG. 1 shown with the primary visor lowered and pivoted to cover the side window for use in blocking light incident from the side of the vehicle;

FIG. 4 is a front elevational view of the structure shown in FIG. 1 with the primary visor shown in the position shown in FIG. 3 and the auxiliary visor shown in a lowered, use position;

FIG. 5 is a front elevational view of the structure shown in FIG. 4 with the sliding panel associated with the auxiliary visor extended;

FIG. 6 is an enlarged, fragmentary, front elevational view of the auxiliary visor body;

FIG. 7 is a front elevational view of the sliding panel associated with the auxiliary visor body shown in FIG. 6;

FIG. 8 is an enlarged fragmentary cross-sectional view of the lower edge of the auxiliary visor taken along section line VIII—VIII of FIG. 6;

FIG. 9 is a left side elevational view of the structure shown in FIG. 6; and

FIG. 10 is a fragmentary, enlarged view of one of the two mounting brackets for the auxiliary visor.

DETAILED DESCRIPTION OF THE PREFERRED EMBODIMENT

Referring initially to FIGS. 1-5, there is shown the preferred embodiment of the invention which is shown installed in a vehicle on the passenger side. The visor system 8 of the present invention comprises a first, or primary, visor 10 and a second, or auxiliary, visor panel 20. Both visors 10 and 20 are coupled between a first mounting bracket 30 and a second mounting bracket 40 which are mounted in spaced relationship to the roof 12 of a vehicle above its windshield 14. In the embodiment shown, the passenger side visor system is mounted to the left of the A-pillar 11 of the vehicle which extends between the windshield 14 and the right side window 15.

As seen in the progression of visor positions, shown in FIGS. 1-5, the first visor 10 operates in the nature of a conventional visor, movable between a raised, stored position, shown in FIG. 1, to a lowered windshield position, as illustrated in FIG. 2. The visor can then be moved to a side window blocking position, shown in FIGS. 3-5. The second, or auxiliary, visor panel 20 can be lowered for use as illustrated in FIGS. 4 and 5. When both visors 10 and 20 are in a raised, stored position, as illustrated in FIG. 1, the auxiliary visor 20 is concealed between visor 10 and roof or headliner 12 of the vehicle, and therefore the system appears substantially the same as a conventional visor installation. Having briefly described the operation of the visor system, a detailed description of the unique visor system is now presented.

The first or primary visor 10 may include an illuminated mirror package of the type described in U.S. Pat. No. 4,227,241 or a slide-out illuminated vanity mirror package as described in U.S. Pat. No. 4,486,819. Alternatively, the visor can be a standard blank visor as illustrated. Visor 10 includes a polymeric core covered by a suitable upholstery material 17 to conform the visor to the interior decor of the vehicle in which it is installed. A visor pivot rod extends within the visor core adjacent the top edge 18 thereof to permit the visor to pivot on the visor rod for movement between a raised, stored position and a lowered, use position, as illustrated in FIGS. 1 and 2, respectively. The visor pivot rod and its connection within the body of a visor such as visor 10 is disclosed in detail in U.S. Pat. No. 4,500,131 entitled VISOR CONTROL, the disclosure of which is incorporated herein by reference. The visor pivot rod is itself conventional and forms no part of the present invention other than providing a pivotal interface between the visor body 10 and the pivot rod extending from an end thereof which is pivotally coupled to mounting bracket 30.

Bracket 30 includes a cast housing with a central cylindrical aperture for receiving a conventional pivot elbow with the visor pivot rod press-fit through an aperture in one end thereof and an opposite end extending through the aperture in housing 32. The pivotal mounting of the elbow within the aperture is provided by a compression spring and locking washer arrangement which is conventional. Visor 10 can thus rotate about the longitudinal axis of bracket 30 to move between the front windshield and the side window, as illustrated in FIGS. 2 and 3.

Bracket 30 includes an integrally molded socket 32 extending in angled relationship and offset from the cylindrical aperture for the pivot rod for supporting one end of the auxiliary visor 20 via a pivot coupling 34 identical to coupling 44 described below in connection with FIG. 10.

The opposite upper end of auxiliary visor panel 20 is supported by mounting bracket 40 which includes a first open cylindrical socket 42, as best seen in FIG. 2, for receiving the rod-shaped mounting clip 19 of visor 10 to alternately hold the visor in the forward position, as illustrated in FIGS. 1 and 2, or release the primary visor for pivoting to a side window position, as illustrated in FIGS. 3-5. Bracket 40, like bracket 30, also integrally includes a second cylindrical socket 41 which includes an opening facing and aligned with the keyed opening of socket 32 of bracket 30. Brackets 30 and 40 thus provide support for both visors 10 and 20 with auxiliary visor 20 being positioned between brackets 30 and 40 and pivoted between a raised, stored position, shown in FIGS. 1-3, and a lowered, use position, shown in FIGS. 4-5, through the pivotal couplings 34 and 44 as described below. Brackets 30 and 40 are identical to corresponding brackets described in U.S. patent application entitled VISOR SYSTEM filed on Nov. 2, 1984, Ser. No. 667,765, the disclosure of which is incorporated herein by reference.

The auxiliary visor 20 of the preferred embodiment of the invention includes an outer visor housing 50 which slideably receives an auxiliary sliding panel 60 which can be moved from a stored position, illustrated in FIG. 4, substantially coextensive and aligned with housing 50 to an extended position illustrated in FIG. 5 in which the auxiliary panel 60 extends immediately adjacent to the "A" pillar 11 of the vehicle filling in the gap 21 shown in FIG. 4. The construction of the auxiliary visor 20 comprising housing 50 and auxiliary sliding panel 60 is now described in conjunction with FIGS. 6-10. Both housing 50 and sliding panel 60 are generally parallelogram shaped, as seen in FIGS. 6 and 7, with interior acute angles of approximately 75° and opposite obtuse angles of approximately 105°. The housing and sliding panel are preferably integrally molded of an opaque polymeric material such as polycarbonate.

Housing 50 integrally includes, along its upper edge, a pivot rod 52 with spaced integral ribs 51 (FIG. 6) terminating at opposite ends in a D-shaped cross section stub axle 53 which, as seen in FIG. 10, fits within the keyed opening of a sleeve 46 of coupling 44. Member 46 is a resilient polymeric material having a D-shaped socket into which the D-shaped stub axle 53 is force-fitted. Member 46 is molded onto the knurled end of a steel shaft 47. The end of shaft 47 opposite sleeve 46 includes an integral molded-on torque fitting as described in the above-identified patent application which is keyed and fits into the keyed socket 42 of mounting bracket 40. Couplings 34 and 44 are identical, and each include a steel shaft with a torque fitting at one end and a sleeve at the opposite end for mounting the auxiliary visor 20 between sockets 32 and 42 of brackets 30 and 40, respectively. This mounting arrangement of the pivot axle 52 of housing 50 thus provides a predetermined controlled amount of torque for securely holding the auxiliary visor 20 in the stored, raised position, as illustrated in FIGS. 1-3, or selectively lowered, use position, as illustrated in FIGS. 4 and 5.

The housing 50 also includes a channel 55 extending along opposite edges and defined by upper and lower integral flanges 56, as best seen in FIGS. 6 and 8, which are spaced from the planar body 59 defining the housing. Flanges 56 are positioned near the opened right end for guidably supporting auxiliary sliding panel 60 therein. Adjacent the open end of the channel 55 at the upper and lower edges of body 59 are stops 58 (FIGS. 6 and 8) which cooperate with resilient tabs 68 and sliding panel 60, as described below, for locking the sliding panel within the housing 50 once assembled. The left and upper and lower edges 54 of body 59 communicating with channel 55 are rolled around the flat parallelogram body 59 of panel 50 to provide a stop and guide for panel 60 and a decorative appearance as well, as seen in FIGS. 2 and 3.

The auxiliary sliding panel 60 similarly has a parallelogram-shaped body which on one surface 69 includes three (3) parallel elongated raised sliding guides 67 with one guide on opposite upper and lower edges and a center guide which provides anti-rattle guiding support for panel 60 within channel 55 of panel 50. Thus, guides 67 ride against the rear surface 57 (FIG. 8) of body 59 at spaced locations to permit relatively easy sliding action between panel 60 and housing 50 and yet prevent unnecessary movement therebetween. Panel 60, like housing 50, is parallelogram shaped, having dimensions slightly smaller than housing 50 so that it easily fits within channel 55. Panel 60 can, in addition to the guide strips 67, be slightly warped along its longitudinal axis; i.e., when viewed from the top as seen in FIG. 7, to also provide additional frictional engagement with channel 55 of housing 50 to control its positioning and sliding motion. A pair of inclined ramps 61 are integrally molded adjacent the opposite edges of panel 60 near handle 62 to provide a tighter fit of panel 60 in housing 50. Thus, as panel 60 is moved to a stored position, the effective thickness of the opposite edges of panel 60 is increased to wedge the panel in place when in a stored position.

Integrally formed and spaced along the upper and lower edges of panel 60 are resilient locking tabs 68 which extend slightly above the upper and lower edges of panel 60, as seen in FIG. 7, and, therefore, resiliently engage the floor 55' (FIG. 8) of channel 55 in a resiliently deflected configuration to prevent skewing of panel 60 within housing 50. The tips 65 of resilient legs 68 are raked outwardly and away from panel 60 and will engage the facing surfaces of upper and lower stops 58 once panel 60 is slid within housing 50 a predetermined distance sufficient to fill the gap 21 (FIG. 4) to prevent removal of the panel. Thus, legs 68 serve not only as a sliding control for panel 60 with respect to housing 50, they also serve as stops preventing inadvertent removal of the sliding panel from the housing. The right edge of panel 60, as best seen in FIG. 7, includes a reinforced edge which defines a handle 62 which extends from the edge of housing 50, as best seen in FIG. 4, to permit panel 60 to be readily extended from housing 50.

Once the primary visor 10 is lowered and moved to the side, as shown in FIG. 3, the auxiliary visor 20 can be lowered from its stored position, as seen in FIGS. 1-3, in which it is hidden behind visor 10 when also stored, to a lowered, use position as shown in FIG. 4. The auxiliary visor panel 60 can be extended as necessary to fill gap 21 between visors 10 and 20 by grasping handle 62 and extending panel 60 as shown in FIG. 5. Thus the use of panel 60 effectively provides a variable with auxiliary visor 20 which cooperates with the primary visor to block incident light from interferring with the driver's or passenger's vision. Although a passenger side installation is shown, it is understood that the driver's side installation is essentially the same with the parts reversed.

It will become apparent to those skilled in the art that various modifications of the preferred embodiment of the invention can be made without departing from the spirit or scope of the invention as defined by the appended claims.

The embodiments of the invention in which an exclusive property or privilege is claimed are defined as follows:

1. A visor system for selectively providing simultaneous sun blocking protection for the windshield and a side window of a vehicle comprising:
   a pair of brackets adapted to be mounted in spaced relationship above a vehicle window;
   a first visor pivotally coupled to one of said brackets for movement of said visor in a generally horizontal direction to selectively provide sun blocking for either the adjacent side window or the windshield; and
   a second visor substantially shorter than said first visor; and means for mounting said second visor between said brackets with the end edge of said second visor nearest said side window being spaced inwardly from said one bracket for permitting said second visor to be pivoted between a raised, stored position adjacent the vehicle roof and a lowered, use position adjacent the vehicle window, said second visor including housing means and an extension panel located adjacent said edge and slidably mounted to said housing means for sliding movement toward said side window along an axis parallel to the longitudinal axis of said second visor between a stored position at least partially within said housing and use positions extended from said housing, whereby said second visor before the extension panel is extended can be pivoted downwardly after which said extension panel can be extended at least as long as said first visor.

2. The visor system as defined in claim 1 wherein said housing comprises a planar body and a pair of spaced flanges extending at least partially along opposite edges thereof to define channel means at opposite sides of said body, said channel means including a floor portion joining said flanges to said body, said channel means slideably receiving said extension panel.

3. A visor system for selectively providing simultaneous sun blocking protection for the windshield and a side window of a vehicle comprising:
   a pair of brackets adapted to be mounted in spaced relationship above a vehicle window;
   a first visor pivotally coupled to one of said brackets for movement of said visor in a generally horizontal direction to selectively provide sun blocking for either a side window or the windshield;
   a second visor, said second visor including housing means and a panel slidably mounted to said housing means for sliding movement along an axis parallel to the longitudinal axis of said second visor between a stored position at least partially within said housing and use positions extended from said housing, wherein said housing comprises a planar body and a pair of spaced flanges extending at least partially along opposite edges thereof to define channel means at opposite sides of said body, said channel means including a floor portion joining said flanges to said body, said channel means slidably receiving said panel wherein said panel includes at least one resilient arm extending outwardly from an edge thereof for engaging said floor portion of said channel means, and means for mounting said second visor between said brackets for permitting said second visor to be moved between a raised, stored position adjacent the vehicle roof and a lowered, use position adjacent the vehicle window.

4. The visor system as defined in claim 3 wherein said panel includes at least a pair of resilient arms extending divergently outwardly from opposite edges of said panel for engaging said floor portions of said channel means.

5. The visor system as defined in claim 3 wherein said channel means includes stop means extending upwardly from said floor portions for engaging said arms to prevent removal of said panel from said housing.

6. The visor system as defined in claim 5 wherein said panel includes at least one longitudinally extending guide member extending outwardly from a side of said panel facing said body.

7. The visor system as defined in claim 6 wherein said panel includes at least a pair of parallel guide members.

8. The visor system as defined in claim 7 wherein said housing and panel are integrally molded of a polymeric material.

9. The visor system as defined in claim 8 wherein said material is a polycarbonate.

10. A visor system for selectively providing simultaneous sun blocking protection for the windshield and a side window of a vehicle comprising:
    a pair of brackets adapted to be mounted in spaced relationship above a vehicle window;
    a first visor pivotally coupled to one of said brackets for movement of said visor in a generally horizontal direction to selectively provide sun blocking for either a side window or the windshield;
    a second visor, said second visor including housing means and a panel slidably mounted to said housing means for sliding movement along an axis parallel to the longitudinal axis of said second visor between a stored position at least partially within said housing and use positions extended from said housing, and means for mounting said second visor between said brackets for permitting said second visor to be moved between a raised, stored position adjacent the vehicle roof and a lowered, use position adjacent the vehicle window wherein said means for mounting said second visor includes a pair of axle stubs at opposite edges of said visor, said stubs D-shaped in cross section, and attaching means including a generally D-shaped aperture for slidably receiving said stubs.

11. A visor system for mounting to the roof of a vehicle above the windshield to selectively provide simultaneous sun blocking protection for the front and a side of the vehicle, said system comprising:

a first visor;

first mounting means for mounting said first visor for movement between a raised, stored position and selected lowered, use positions along the windshield or side window;

a second visor having an adjustable width wherein said second visor includes a housing and a panel slidably mounted to said housing and wherein said housing comprises a planar body and a pair of spaced flanges extending at least partially along opposite edges thereof to define channel means at opposite sides of said body, said channel means including a floor portion joining said flanges to said body, said channel means slidably receiving said panel and wherein said panel includes at least one resilient arm extending outwardly from an edge thereof for engaging said floor portion of said channel means; and second mounting means coupled to said second visor for supporting said second visor for pivotal movement between a raised, stored position adjacent the vehicle roof and a lowered, sun blocking position adjacent the windshield.

12. The visor system as defined in claim 11 wherein said panel includes at least a pair of resilient arms extending divergently outwardly from opposite edges of said panel for engaging said floor portions of said channel means.

13. The visor system as defined in claim 12 wherein said channel means includes stop means extending upwardly from said floor portions for engaging said arms to prevent removal of said panel from said housing.

* * * * *